United States Patent [19]

Tartaglia et al.

[11] Patent Number: 5,020,571

[45] Date of Patent: Jun. 4, 1991

[54] NOISE-REDUCING VALVE CONSTRUCTION

[75] Inventors: Peter A. Tartaglia, Butler; Richard B. Collins, Denville; Robert S. Smolen, Bloomingdale, all of N.J.

[73] Assignee: Marotta Scientific Controls, Inc., Montville, N.J.

[21] Appl. No.: 538,560

[22] Filed: Jun. 15, 1990

[51] Int. Cl.⁵ .......................... F16K 47/08; F15D 1/00
[52] U.S. Cl. ............................. 137/625.3; 137/625.37; 138/42; 251/127
[58] Field of Search ................. 137/625.3, 625.37; 251/127; 138/42

[56] References Cited

U.S. PATENT DOCUMENTS 4,567,915  2/1986  Bates et al. .................. 137/625.3 X
4,617,963  10/1986  Stares ............................. 137/625.3

Primary Examiner—Arnold Rosenthal
Attorney, Agent, or Firm—Hopgood, Calimafde, Kalil, Blaustein & Judlowe

[57] ABSTRACT

The invention provides a two-part casing for a multi-stage valve, itself configured for noise-reduction. Further noise reduction is achieved by complaint suspension of the valve in a two-part casing wherein separable parts of the casing define a cavity for containing nested stages of the valve. Provision is made for selective adjustment of compressional loading of the compliant suspension.

11 Claims, 3 Drawing Sheets

FIG. 4.
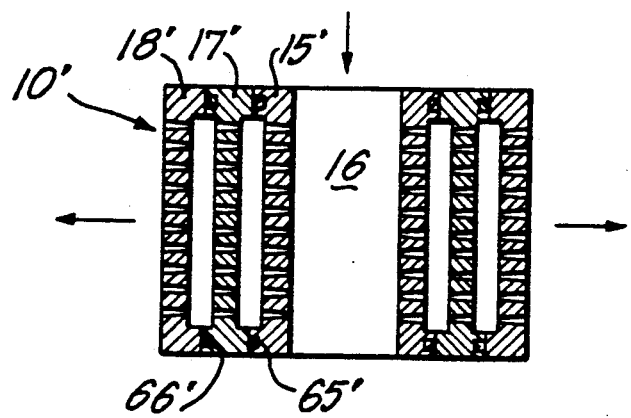
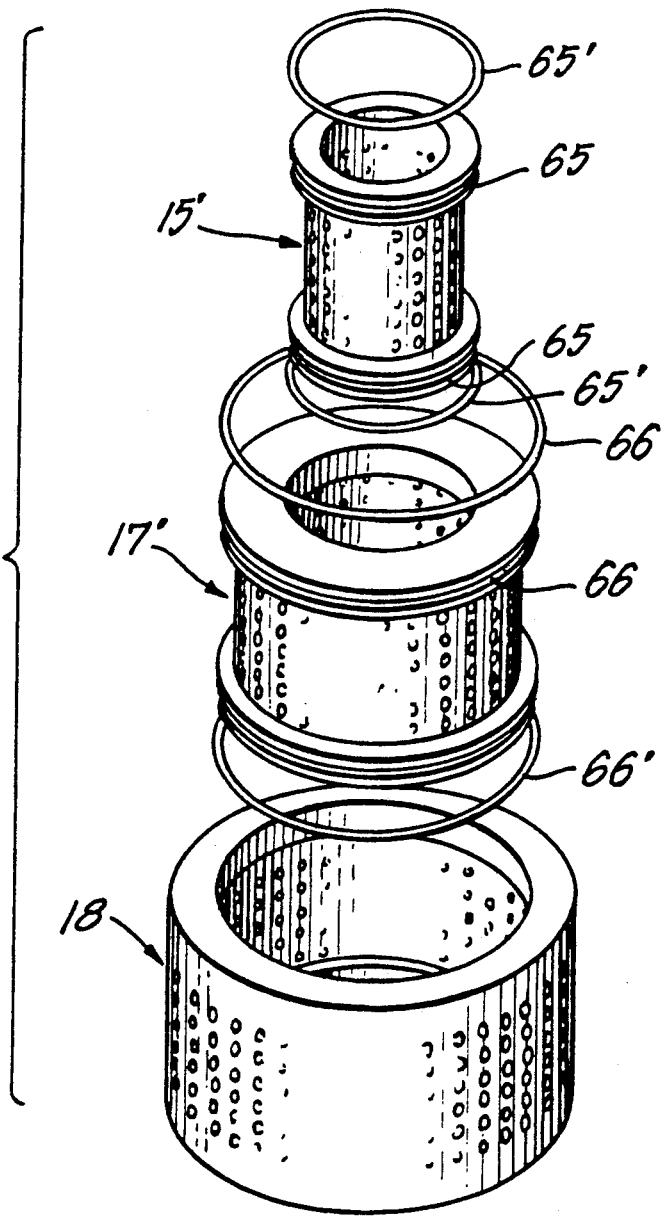
FIG. 5.

NOISE-REDUCING VALVE CONSTRUCTION

BACKGROUND OF THE INVENTION

The invention relates to a "quiet-operating" valve construction, as for use in conjunction with throttling elements of a reducing valve. The constructions disclosed in U.S. Pat. No. 4,921,014 are illustrative of one kind of valve to which the improvement of the present invention is applicable, and therefore the disclosure of said patent is hereby incorporated by reference.

In general, it may be said that a valve suitable for use in the present invention may comprise a radially stacked succession or nesting of concentric annuli, wherein a poppet member is guided in the bore of the innermost annulus. The annuli provide successive stages of circumferentially and axially distributed radial passages, with manifolding connection of plural passages of each stage to the next-succeeding stage; and, to serve the purposes of progressive pressure reduction, the total collective sectional area increases, for the passages of each successive stage. In a pressure-reducing application, poppet position determines the volume of inlet or upstream flow to be served by some or by all of the passages of the inner annulus, and the successive stages serve progressive fractions of desired pressure reduction. Outlet or downstream flow from the valve is taken via a circumferential manifold around the outermost multiple-passage annulus.

Despite the achievements of valve constructions according to said patent, there is a need for even further noise reduction and for more ready servicing, by disassembly for periodic cleaning to assure design flow capability of the passages of all stages.

BRIEF STATEMENT OF THE INVENTION

It is an object of the invention to provide an improved valve of the character indicated, and particularly adapted to small-scale construction.

Another object is to provide a noise-reducing mounting for a valve of the character indicated.

It is a specific object to meet the above objects with a construction wherein the valve itself is effectively compliantly suspended in a noise-containment envelope or casing.

Another specific object is to meet the above specific object by providing for selective adjustment of the compliant suspension.

A general object is to meet the above objects with a valve construction that incorporates superior sealing of connections between successive stages, while at the same time facilitating the disassembly and servicing of all components of the valve.

The invention achieves these objects by providing a two-part casing for the indicated multistage valve, wherein separable parts of the casing define a cavity for containing the nested stages of the valve. The cavity is cylindrical and has (i) axial-end wall surfaces that are spaced in excess of the axial length of the nested stages of the valve and (ii) a circumferential manifold surface in radial clearance with the plural radial passages of the outer tubular body member. Compliantly yieldable material is interposed between the respective end wall of the nested stages and the end-wall surfaces of the cavity, and the yieldable material is centrally open for accommodation of the poppet member. The casing provides an inlet-port connection to one end of the innermost bore of the nested stages, and the manifold surface of the casing has an outlet-port connection to the region of radial clearance. The two parts of the casing have such threaded engagement as to enable selective application of compressional load on the compliantly yieldable material.

DETAILED DESCRIPTION

The invention will be described in detail for preferred embodiments, in conjunction with the accompanying drawings, in which:

FIG. 4 is a view similar to FIG. 2, to show a modification; and

FIG. 5 is an exploded isometric view, as in FIG. 3 but specific to the modification of FIG. 4.

Figure 1:
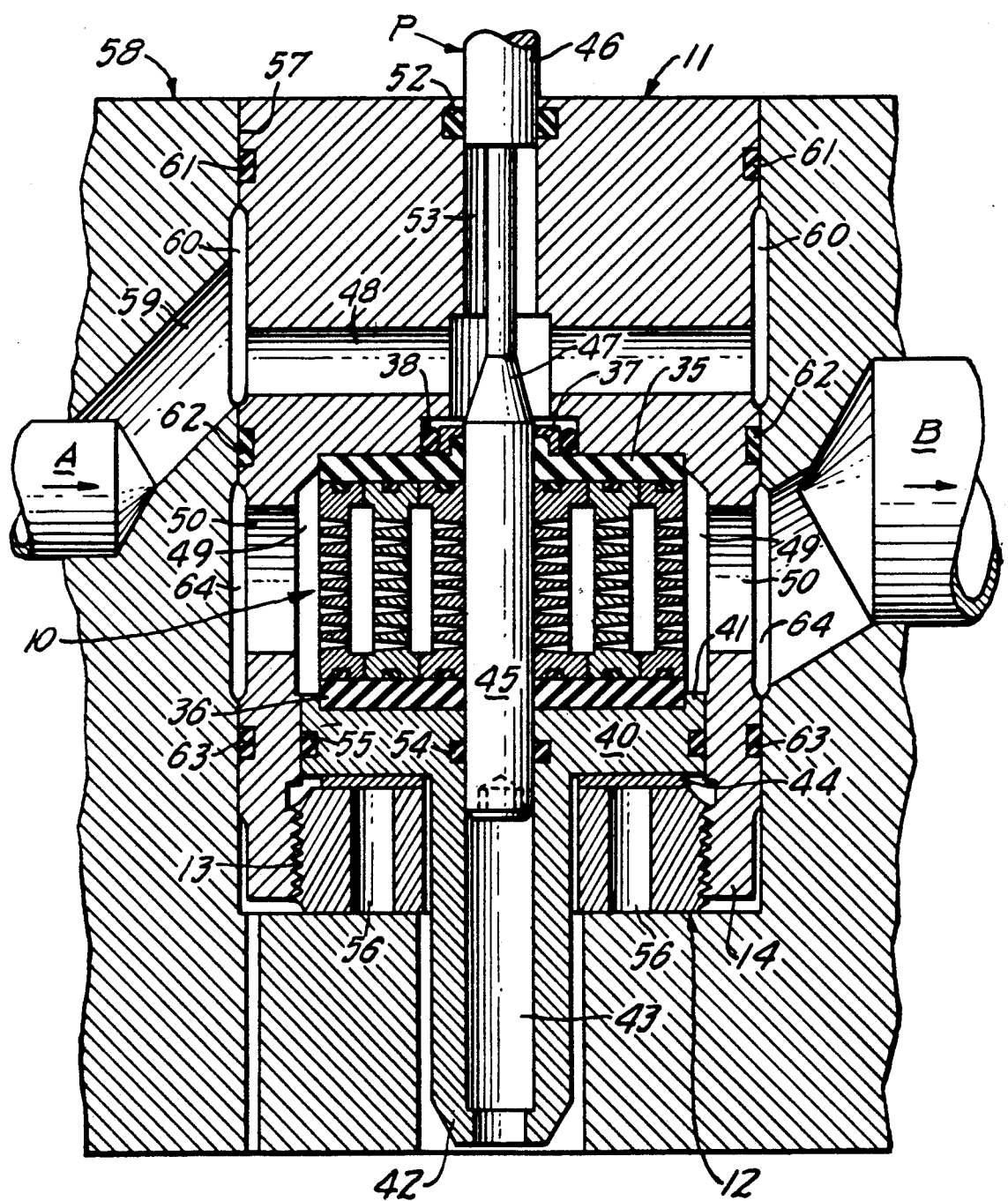
FIG. 1 is a longitudinal section of a valve construction of the invention, drawn to enlarged scale.
Figure 2:
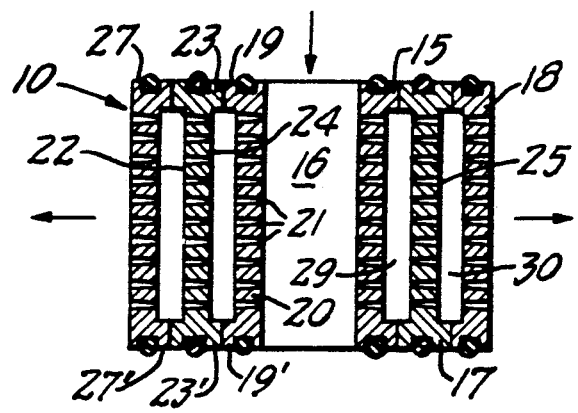
FIG. 2 is a longitudinal section of the multiple-stage portion of the valve of FIG. 1.
Figure 3:
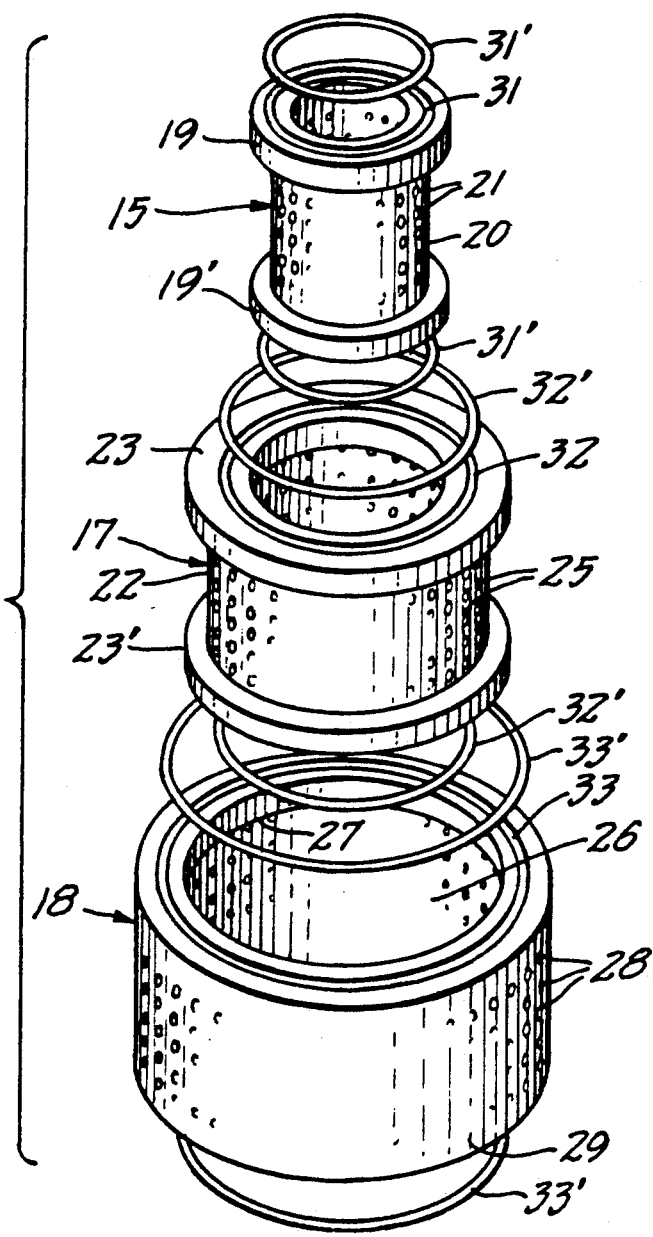
FIG. 3 is an exploded isometric view of components of the multiple-stage portion of FIG. 2.

In FIG. 1, a concentrically nested array 10 of multiple stages of pressure-reducing passages is seen to be suspended within a relatively massive containment casing which consists of a cup-shaped casing part 11 and an annular closure part 12 having threaded reception at 13 to the skirt or open-end portion 14 of the casing part 11; continuous flow of pressure fluid is accommodated between a high-pressure inlet connection A and a reduced-pressure outlet connection B, all in accordance with current axially adjustable positioning of a poppet member P, as will become clear. The nested array 10 follows teachings of said patent and is seen in FIGS. 2 and 3 to comprise an inner tubular member 15 having a cylindrical poppet-guide bore 16, and plural further tubular members 17, 18 assembled thereto. All tubular members 15, 17, 18 are of the same axial length, so that the nested array has a cylindrical profile, with like circular end walls.

As shown, the inner tubular member 15 is characterized by like flanges 19, 19' at the axial ends of a reduced cylindrical body surface 20, and plural axially spaced sets of passages 21 extend radially from bore 16 through to the body surface 20. The next successive tubular member 17 may be similarly formed on its outer body surface 22, between spaced end flanges 23, 23', but is shown further with an inner body surface 24 that is effectively recessed with respect to the radially inner portions of flanges 23, 23'. As with the inner tubular member 15, the body of the next succeeding tubular member 17 has plural axially spaced sets of passages 25, extending radially through the body of member 17; the number of passages 25 exceeds the number of passages 21 through the body of member 15, whereby the total sectional area of passages 25 exceeds the total sectional area of passages 21.

At the respective axial ends of the nested array 10, confronting cylindrical lands of adjacent flanges 19/23 and 19'/23' have a slip-fit relation, whereby to facilitate assembly and disassembly, as for inspection, cleaning or other maintenance operations.

In similar fashion, the outer tubular member 18 has a recessed inner cylindrical body surface 26, between end-flange formation 27, 27', and plural axially spaced sets of passages 28 extend radially from body surface 26 to the outer cylindrical surface 29 of outer tubular member 18. Again, confronting cylindrical lands of adjacent flanges 23/27 and 23'/27' have a slip-fit relation for ease of assembly and disassembly, and the number of radial passages 28 through the body of outer tubular member 18 exceeds the number of radial passages 25 in tubular member 17.

The region 29 between slip-fitted lands at adjacent flanges 19/23 and 19'/23' defines a first circumferentially continuous annular manifold to receive a first-stage discharge of fluid flow through passages 21 of the inner tubular member 15, and to uniformly supply such first-stage discharge flow to the passages 25 of the next-succeeding stage 17. Similarly, the region 30 between slip-fitted lands at adjacent flanges 23/27 and 23'/27' defines a second circumferentially continuous annular manifold to receive a second-stage discharge of fluid flow through passages 25 of the second tubular member 17, and to uniformly supply such second-stage discharge flow to the passages 28 of the next-succeeding outer stage 18. The aggregate discharge of passages 29 is to another annular manifold, as will be later explained.

Description of the slip-fitted stage members 15, 17, 18 is completed by identifying axially open, circumferentially continuous grooves, as at 31, 32, 33, in the respective axial-end wall areas of members 15, 17, 18, for locating reception of an elastomeric O-ring (31', 32', 33') of appropriate size in each groove. The assembled array 10 is thus of right-cylindrical profile, except for the slight circumferentially continuous bulge of an O-ring in each of the grooves.

Returning now to FIG. 1, the casing parts 11, 12 are seen to define a generally cylindrical cavity in which the assembled array 10 is suspended, by and between relatively thick annular discs 35, 36 of compliant material, each of which is centrally open to conform to the diameter of bore 16 of the inner tubular member 15; the outer diameters of discs 35, 36 conform to the outer diameter of the assembled multi-stage array 10. In the case of disc 35, a central boss extends axially outward to locate an annular cap 37, and an elastomeric O-ring 38 is shown compressed between the outer land surface of cap 37 and the cylindrical wall of a short central recess in the bottom of the cupped cavity of casing part 11; disc 35 is further located in another and larger-diameter recess in the bottom of this cupped cavity. In the case of disc 36, an axially short counterbore in the face of a circular plate 40 establishes a circumferential lip 41 for location of disc 36. Plate 40 has a central poppet-guide bore 43 conforming to the diameter of the poppet-guide bore 16 of inner tubular member 15, and a tubular guide element 42 is shown integrally formed with plate 40, providing an axially outward extension of the guide bore 43 of plate 40.

A washer 44 is interposed between closure member 12 and plate 40, for uniformly distributed compressional squeezing action on the compliant discs 35, 36, upon threaded advance of closure member 12 into the otherwise-open end of casing part 11.

The poppet P is seen to comprise an elongate cylindrical portion 45 deriving piloting guidance from the bores 16 and 43, throughout controlled positioning displacement, pursuant to actuating force applied to an externally accessible portion 46 of the poppet. For the position shown in FIG. 1, the poppet has covered all passages of inner tubular member 15, thus closing the valve. But on sufficient downward displacement, the characterizing frustoconical valve-member portion 47 of the poppet begins to clear initially openable passages 21 of inner tubular member 15, thus beginning to open the valve to incoming flow from an inlet passage 48 in casing 11. After passing all stages of the array 10, fluid flow is received in another annular manifold 49, as determined by an internal circumferentially continuous contour of skirt 14, and with external-discharge porting formations 50 in skirt 14.

The casing 11, 12 and its multi-stage contents 10, with compliant discs 35, 36 and plate 40, will be seen as a unit-handling assembly, complete with an internal O-ring seal 52 of poppet P (to the guide-bore portion 53 of casing part 11), an internal O-ring seal 54 of poppet P (to the guide-bore portion 43 of plate 40 and its tubular extension), and a further internal O-ring seal 55 of plate 40 (to a smooth cylindrical bore portion of the skirt 14 of casing part 11). The compressional loading of discs 35, 36 on the O-ring seals at the end walls of the multi-stage array 10 is readily effected by torquing the threaded advance at 13, as by spanner access to diametrically opposed access bores 56 in closure part 12. And of course, an unthreading removal of closure part 12 from casing part 11 will release all parts for full disassembly, inspection, and servicing, as well as for later testing and calibration, in readiness for reinstallation, as in the bore 57 of larger structure 58 a fragmentary portion of which is shown in FIG. 1.

The larger structure 58 is seen to provide inlet-flow supply to the passage 48 of casing part 11, via a bore 59 from the inlet connection A to a circumferential manifold region 60, and the integrity of this path of inlet flow is assured by O-ring seals 61, 62 above and below the manifold region 60. In similar fashion, O-ring seals 62, 63 above and below another manifold region 64 assure integrity of discharge flow via ports 50 to the outlet connection B.

The array embodiment 10' of FIGS. 4 and 5 will be seen to be identical to that of FIGS. 2 and 3, except for the placement and utilization of O-ring seals. Specifically, the O-ring seals in FIGS. 4 and 5 are located in radially outwardly open circumferential grooves 65, 66 in the respective convex cylindrical lands of the tubular members 15' and 17', and these seals are designated with primed notation (65', 66') that is correlated with the identification of the grooves to which they are fitted. This being the configuration, it will be understood that, when the multi-stage array 10' of FIGS. 4 and 5 is assembled to the casing 11, 12 of FIG. 1, the compliant discs 35, 36 fit continuously to the respective end areas of the assembled array, and in axially compressed loading, as determined by the threaded advance of closure 12 at 13.

As explained in U.S. Pat. No. 4,921,014, each of the radial passages of the respective tubular members is preferably configured as a frusto-conical diffuser, expanding from a radially inner entrance to a radially outer exit. Illustratively, this expansion may be 1:2 in diameter (1:4 in section area), as from 0.010-inch diameter to 0.020-inch diameter. These illustrative numbers apply for valve structure involving an array 10 or 10' of as small as 3/16-inch outer diameter.

The compliant material at 35, 36 may be elastomeric, having a durometer of at least 90. Present experience has been satisfactory with products respectively known as Navydamp and Isodamp, being commercial products of EAR Division of Cabot Corporation, Indianapolis, Ind.

It is to be understood that the showings of three-stage devices 10, 10' herein is purely illustrative, in that the number of stages will depend on the performance properties desired for particular applications.

What is claimed is:

1. Noise-reducing valve structure, comprising a cylindrical body of nested tubular body members, said tubular members collectively defining spaced radial end walls when in nested array, a poppet member guided by the bore of the inner one of said tubular body members, said body members having plural generally radial passages and circumferential manifold groove formations at interface regions between body members, a valve casing comprising separable parts defining a cylindrical cavity containing the nested array of tubular members, said cavity having radial clearance via a portion of said manifold surface, the radial passages and manifold-groove formations of said body members extending over an axial range which is short of each axial end, the radially adjacent axial end portions of said body members being cylindrical and circumferentially continuous, whereby a pair of radially confronting land surfaces exists at each axial end of radially adjacent body members, one of the cylindrical land surfaces of each said pair having a circumferentially continuous groove formation, and an elastomeric O-ring in each of said grooves and establishing a circumferentially continuous seal between the cylindrical land surfaces of each pair.

2. Noise-reducing valve structure, comprising a cylindrical body of nested tubular body members, said tubular members collectively defining spaced radial end walls when in nested array, a poppet member guided by the bore of the inner one of said tubular body members, said body members having plural generally radial passages and circumferential manifold groove formations at interface regions between body members, a valve casing comprising separable cup and closure-member parts defining a cylindrical cavity containing the nested array of tubular members, said cavity having (i) axial-end wall surfaces that are spaced in excess of the axial length of the nested array of tubular members and (ii) a circumferential manifold surface in radial clearance with the plural radial passages of the outer tubular body member, compliantly yieldable material interposed between the respective radial end walls of said array and the end-wall surfaces of the cavity, said yieldable material being centrally open for accommodation of said poppet member, the cup part of said casing having (a) an end-closure wall defining one of the end-wall surfaces of the cavity and formed with an inlet-port connection to one end of the bore of said inner tubular member and (b) a cylindrical skirt wall formed with an outlet-port connection to said radial clearance via a portion of said manifold surface, and said closure-member part defining the other end-wall surface of the cavity and being retained by said skirt.

3. Noise-reducing valve structure according to claim 2, in which said closure member is retained in axial compression of said compliantly yieldable material.

4. Noise-reducing valve structure according to claim 3, in which the axially outer open end of said skirt is threaded, and in which said closure member includes a clamp disc with external threads engaged to the skirt threads.

5. Noise-reducing valve structure according to claim 4, in which a circular plate is interposed between said clamp disc and the axially adjacent yieldable material and end wall of said array, the bore of said skirt having a cylindrical intermediate portion having a slip-fit guidance relation with the periphery of said circular plate, whereby said plate defines an end wall of said cavity.

6. Noise-reducing valve structure according to claim 5, in which said circular plate is an annular flange integrally formed with an axially extending poppet-guide portion that is radially spaced from the threads of said skirt, and in which said clamp disc includes an annular portion received within the radial space between said poppet-guide portion and the threads of said skirt.

7. Noise-reducing valve structure according to claim 1, in which said compliantly yieldable material comprises separate annular discs, said discs being interposed between the respective end walls of the nested array and the end-wall surface of the cavity, and each of said discs being in radially lapping abutment with all of the end walls of the nested array at each disc's end of the nested array.

8. Noise-reducing valve structure according to claim 1, in which said compliantly yieldable material comprises separate annular discs, said discs being interposed between the respective end walls of the nested array and the end-wall surfaces of the cavity, and in which each tubular body member has an annular radial-plane surface at each of its axial ends and is formed with an outwardly open circumferentially continuous groove between radial limits of each of the radial-plane surfaces thereof, and an elastomeric O-ring in each of said grooves, said annular discs being in axially compressing engagement with said O-rings.

9. Noise-reducing valve structure, comprising a cylindrical body of nested tubular body members, said tubular members collectively defining spaced radial end walls when in nested array, a poppet member guided by the bore of the inner one of said tubular body members, said body members having plural generally radial passages and circumferential manifold groove formations at interface regions between body members, a valve casing comprising separable parts defining a cylindrical cavity containing the nested array of tubular members, said cavity having (i) axial-end wall surfaces that are spaced in excess of the axial length of the nested array of tubular members and (ii) a circumferential manifold surface in radial clearance with the plural radial passages of the outer tubular body member, compliantly yieldable material interposed between the respective radial end walls of said array and the end-wall surfaces of the cavity, said yieldable material being centrally open for accommodation of said poppet member, said casing having an inlet-port connection to one end of the bore of said tubular member, said casing having an outlet-port connection to said (i) axial-end wall surfaces that are spaced in excess of the axial length of the nested array of tubular members and (ii) a circumferential manifold surface in radial clearance with the plural radial passages of the outer tubular body member, compliantly yieldable material interposed between and abutting the respective radial end walls of all tubular body members of said array and the end-wall surfaces of the cavity, said yieldable material being centrally open for accommodation of said poppet member, said casing having an inlet-port connection to one end of the bore of said inner tubular member, and said casing having an outlet-port connection to said radial clearance via a portion of said manifold surface.

10. Noise-reducing valve structure according to claim 5, in which said plate has a central guide bore for piloting guidance of one end of said poppet member.

11. Noise-reducing valve structure, comprising a cylindrical body of nested tubular body members, said tubular members collectively defining spaced radial end walls when in nested array, a poppet member guided by the bore of the inner one of said tubular body members, said body members having plural generally radial passages and circumferential manifold groove formations at interface regions between body members, a valve casing comprising separable parts defining a cylindrical cavity containing the nested array of tubular members, said cavity having (i) axial-end wall surfaces that are spaced in excess of the axial length of the nested array of tubular members and (ii) a circumferential manifold surface in radial clearance with the plural radial passages of the outer tubular body member, compliantly yieldable material interposed between the respective radial end walls of said array and the end-wall surfaces of the cavity, said yieldable material being centrally open for accommodation of said poppet member, said casing having an inlet-port connection to one end of the bore of said tubular member, said casing having an outlet-port connection to said radial clearance via a portion of said manifold surface, and said separable parts on each axial side of said nested array have central guide-bore formations providing piloting axial-displacement guidance of said poppet member on both axial sides of said array.

* * * * *